United States Patent
Guo et al.

(10) Patent No.: US 11,531,218 B2
(45) Date of Patent: Dec. 20, 2022

(54) DIMMING MIRROR AND METHOD FOR MANUFACTURING SAME, AND DIMMING APPARATUS

(71) Applicant: BOE Technology Group Co., Ltd., Beijing (CN)

(72) Inventors: Jingwen Guo, Beijing (CN); Yanzhao Li, Beijing (CN); Yongchun Tao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 252 days.

(21) Appl. No.: 16/841,771

(22) Filed: Apr. 7, 2020

(65) Prior Publication Data
US 2021/0124193 A1 Apr. 29, 2021

(30) Foreign Application Priority Data
Oct. 28, 2019 (CN) .......................... 201911032127.0

(51) Int. Cl.
*G02B 26/00* (2006.01)
*G02F 1/01* (2006.01)

(52) U.S. Cl.
CPC ........ *G02F 1/0131* (2013.01); *G02F 2201/50* (2013.01); *G02F 2203/02* (2013.01)

(58) Field of Classification Search
CPC ............... G02F 1/0131; G02F 2201/50; G02F 2203/02; G02B 26/00; G02B 26/08
USPC ....... 359/212.1, 224.1, 224.2, 247, 290, 291
See application file for complete search history.

(56) References Cited

U.S. PATENT DOCUMENTS

| | | | |
|---|---|---|---|
| 2002/0149864 | A1 | 10/2002 | Kaneko |
| 2004/0217378 | A1* | 11/2004 | Martin ................ G09G 3/3466 257/200 |
| 2006/0012852 | A1 | 1/2006 | Cho et al. |
| 2007/0223118 | A1 | 9/2007 | Dupuis |
| 2011/0149408 | A1 | 6/2011 | Hahgholt et al. |

(Continued)

FOREIGN PATENT DOCUMENTS

| | | |
|---|---|---|
| CN | 1752794 A | 3/2006 |
| CN | 101023386 A | 8/2007 |

(Continued)

OTHER PUBLICATIONS

First office action of Chinese application No. 201911032127.0 dated May 21, 2021.

*Primary Examiner* — William Choi
(74) *Attorney, Agent, or Firm* — Fay Sharpe LLP

(57) ABSTRACT

The present disclosure discloses a dimming mirror and a manufacturing method thereof, and a dimming apparatus. The dimming mirror includes a dimming layer including a plurality of dimming units. Each of the dimming units includes a first driving structure and a second driving structure opposite to each other, and an elastic supporting structure disposed between the first driving structure and the second driving structure. The first and second driving structures and the elastic supporting structure enclose a dimming chamber. The first and second driving structures are configured to adjust a dimming angle of the dimming unit by adjusting a gap width of the dimming chamber, such that a response wavelength of the dimming mirror is adjusted. The present disclosure facilitates the improvement of the flexibility of the dimming mirror.

17 Claims, 10 Drawing Sheets

(56) References Cited

U.S. PATENT DOCUMENTS

2012/0281270 A1  11/2012  Hong et al.
2013/0241939 A1* 9/2013  Lasiter ................ H01G 4/1209
                                                  29/829

FOREIGN PATENT DOCUMENTS

| CN | 101517452 A | 8/2009 |
| CN | 103502874 A | 1/2014 |
| CN | 105676448 A | 6/2016 |

* cited by examiner dogs# DIMMING MIRROR AND METHOD FOR MANUFACTURING SAME, AND DIMMING APPARATUS This application claims priority to Chinese Patent Application No. 201911032127.0, filed on Oct. 28, 2019 and entitled "DIMMING MIRROR AND METHOD FOR MANUFACTURING SAME, AND DIMMING APPARATUS", the entire contents of which are incorporated herein by reference.

TECHNICAL FIELD

The present disclosure relates to a dimming mirror and a method for manufacturing the same, and a dimming apparatus.

BACKGROUND

A dimming mirror is an optical element for regulating light. A common dimming mirror includes a lens, a prism, a reflecting mirror, and the like. As a typical lens, the Fresnel lens has been widely applied to defense, aviation, industrial production, civil, and other fields due to such advantages as small size, light weight, compact structure, excellent light converging performance, better imaging quality, and the like. Thus, design and manufacture of a large-scale and high-precision Fresnel lens have become a main research direction of lenses.

SUMMARY

Embodiments of the present disclosure provide a dimming mirror and a method for manufacturing the same, and a dimming apparatus. The technical solutions are as follows:

In a first aspect, a dimming mirror is provided. The dimming mirror includes:

a base substrate, and a dimming layer disposed on the base substrate, wherein the dimming layer includes a plurality of dimming units;

wherein each of the dimming units includes a first driving structure and a second driving structure opposite to each other, and an elastic supporting structure disposed between the first driving structure and the second driving structure, the first and second driving structures and the elastic supporting structure enclosing a dimming chamber;

wherein the first and second driving structures are configured to adjust a dimming angle of the dimming unit by adjusting a gap width of the dimming chamber.

Optionally, the dimming chamber satisfies any one of the following conditions:

the dimming chamber is an empty chamber; and an elastic refractive medium is provided in the dimming chamber.

Optionally, the first driving structure is plate-shaped, and the first driving structures of all the dimming units are formed into an integrated structure; and the second driving structure is block-shaped, and a shape of a cross section of the second driving structure includes at least one of a circle and a polygon.

Optionally, the first driving structure and the second driving structure satisfy any one of the following conditions:

both the first driving structure and the second driving structure are a driving electrode;

both the first driving structure and the second driving structure are an electromagnetic driving structure;

at least one of the first driving structure and the second driving structure is a thermal expansion driving structure; and at least one of the first driving structure and the second driving structure is a pneumatic driving structure.

Optionally, the dimming unit further includes: a carrier film disposed on a side of the elastic supporting structure distal from the first driving structure, the second driving structure being disposed on a side of the carrier film distal from the first driving structure.

Optionally, the carrier films of all the dimming units are formed into an integrated structure.

Optionally, the first driving structure, the elastic supporting structure, the carrier film, and the second driving structure are distributed in a direction distal from the base substrate.

Optionally, the plurality of dimming units satisfy any one of the following:

the plurality of dimming units are arranged in an array to form a plurality of dimming rings and a dimming circle which are concentric, wherein the plurality of dimming rings are equally spaced apart outside the dimming circle in a direction distal from the dimming circle;

the plurality of dimming units are arranged in an array to form a plurality of linear dimming strips which are parallel to each other and are equally spaced apart; and the plurality of dimming units are arranged in an array to form a plurality of arc-shaped dimming strips which are equally spaced apart on the same fan-shaped area interval and share a common circle center.

Optionally, the dimming mirror further includes:

a protective layer disposed on a side of the dimming layer distal from the base substrate.

Optionally, the dimming mirror further includes:

a reflective layer disposed on a side of the dimming layer distal from the base substrate.

Optionally, the dimming mirror includes any one of a biconvex lens, a plano-convex lens, and a plano-concave lens.

Optionally, the dimming unit further includes a carrier film; wherein the first driving structure, the elastic supporting structure, the carrier film and the second driving structure are distributed in a direction distal from the base substrate; the carrier films of all the dimming units are formed into an integrated structure; the first driving structure is plate-shaped, and the first driving structures of all the dimming units are formed into an integrated structure; the second driving structure is block-shaped, and a shape of a cross section of the second driving structure includes at least one of a circle and a polygon;

the first driving structure and the second driving structure satisfy any one of the following conditions:

both the first driving structure and the second driving structure are a driving electrode, both the first driving structure and the second driving structure are an electromagnetic driving structure, at least one of the first driving structure and the second driving structure is a thermal expansion driving structure, and at least one of the first driving structure and the second driving structure is a pneumatic driving structure;

the dimming chamber satisfies any one of the following conditions:

the dimming chamber is an empty chamber, and an elastic refractive medium is provided in the dimming chamber;

the plurality of dimming units satisfy any one of the following conditions:

the plurality of dimming units are arranged in an array to form a plurality of dimming rings and a dimming circle which are concentric, wherein the plurality of dimming rings are equally spaced apart outside the dimming circle in a direction distal from the dimming circle, the plurality of dimming units are arranged in an array to form a plurality of linear dimming strips which are parallel to each other and are equally spaced apart, and the plurality of dimming units are arranged in an array to form a plurality of arc-shaped dimming strips which are equally spaced apart on the same fan-shaped area and share a common circle center; and the dimming mirror further includes:

a reflective layer disposed on a side of the dimming layer distal from the base substrate, and a protective layer disposed on a side of the reflective layer distal from the base substrate.

In a second aspect, a method for manufacturing a dimming mirror is provided. The method includes:

providing a base substrate; and forming a dimming layer on the base substrate, wherein the dimming layer includes a plurality of dimming units; each of the dimming units includes a first driving structure and a second driving structure opposite to each other, and an elastic supporting structure disposed between the first driving structure and the second driving structure, the first and second driving structures and the elastic supporting structure enclosing a dimming chamber; and the first and second driving structures are configured to adjust a dimming angle of the dimming unit by adjusting a gap width of the dimming chamber.

Optionally, forming the dimming layer on the base substrate includes:

forming a first driving layer on the base substrate, the first driving layer comprising a first driving structure;

forming an elastic supporting layer on a side of the first driving layer distal from the base substrate, the elastic supporting layer including a plurality of elastic supporting structures; and forming a second driving layer on a side of the elastic supporting layer distal from the base substrate, the second driving layer including a plurality of second driving structures, wherein the first driving structure, each second driving structure, and the corresponding elastic supporting structure disposed between the first driving structure and the second driving structure enclose the dimming chamber.

Optionally, upon forming the elastic supporting layer on the side of the first driving layer distal from the base substrate, the method further includes:

forming a carrier film on a side of the elastic supporting layer distal from the base substrate; and forming the second driving layer on the side of the elastic supporting layer distal from the base substrate includes:

forming the second driving layer on a side of the carrier film distal from the base substrate.

Optionally, forming the dimming layer on the base substrate includes:

forming a first driving layer on the base substrate, the first driving layer comprising a first driving structure;

forming an elastic supporting layer on a side of the first driving layer distal from the base substrate, the elastic supporting layer comprising a plurality of elastic supporting structures;

forming a second driving layer on a carrier substrate, the second driving layer comprising a plurality of second driving structures;

bonding the carrier substrate on which the second driving layer is formed to the base substrate on which the first driving layer and the elastic supporting layer are formed to enable the first driving structure, each second driving structure, and the corresponding elastic supporting structure disposed between the first driving structure and the second driving structure to enclose the dimming chamber; and peeling off the carrier substrate.

Optionally, upon forming the second driving layer on the carrier substrate, the method further includes:

forming a carrier film on a side of the second driving layer distal from the carrier substrate; and bonding the carrier substrate on which the second driving layer is formed to the base substrate on which the first driving layer and the elastic supporting layer are formed includes:

bonding the carrier substrate on which the second driving layer and the carrier film are formed to the base substrate on which the first driving layer and the elastic supporting layer are formed.

Optionally, upon forming the dimming layer on the base substrate, the method further includes:

forming a protective layer on a side of the dimming layer distal from the base substrate.

Optionally, prior to forming the protective layer on the side of the dimming layer distal from the base substrate, the method further includes:

forming a reflective layer on a side of the dimming layer distal from the base substrate; and forming the protective layer on the side of the dimming layer distal from the base substrate includes:

forming the protective layer on a side of the reflective layer distal from the base substrate.

In a third aspect, a dimming apparatus is provided. The apparatus includes any one of the dimming mirrors in the first aspect.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without any creative efforts.

The accompanying drawings, which are incorporated in and constitute a part of this specification, illustrate embodiments consistent with the present disclosure, and together with the description, serve to explain the principles of the present disclosure.

DETAILED DESCRIPTION

For clearer descriptions of the principles, technical solutions and advantages in the embodiments of the present disclosure, the present disclosure is described in detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

The Fresnel lens is a typical lens. Design and manufacture of the Fresnel lens relate to various technical fields such as optical engineering and polymer material engineering, as well as various processes such as a computerized numerical control (CNC) machining process, a diamond turning process, a nickel plating process, a molding process, an injection molding process and a casting process. At present, the Fresnel lens is manufactured by generally using organic materials or glass through casting shaping technique. However, a response wavelength (such as a light transmission wavelength of the lens) of the Fresnel lens manufactured by the casting shaping technique is fixed, resulting in poorer flexibility of the lens.

Figure 1:
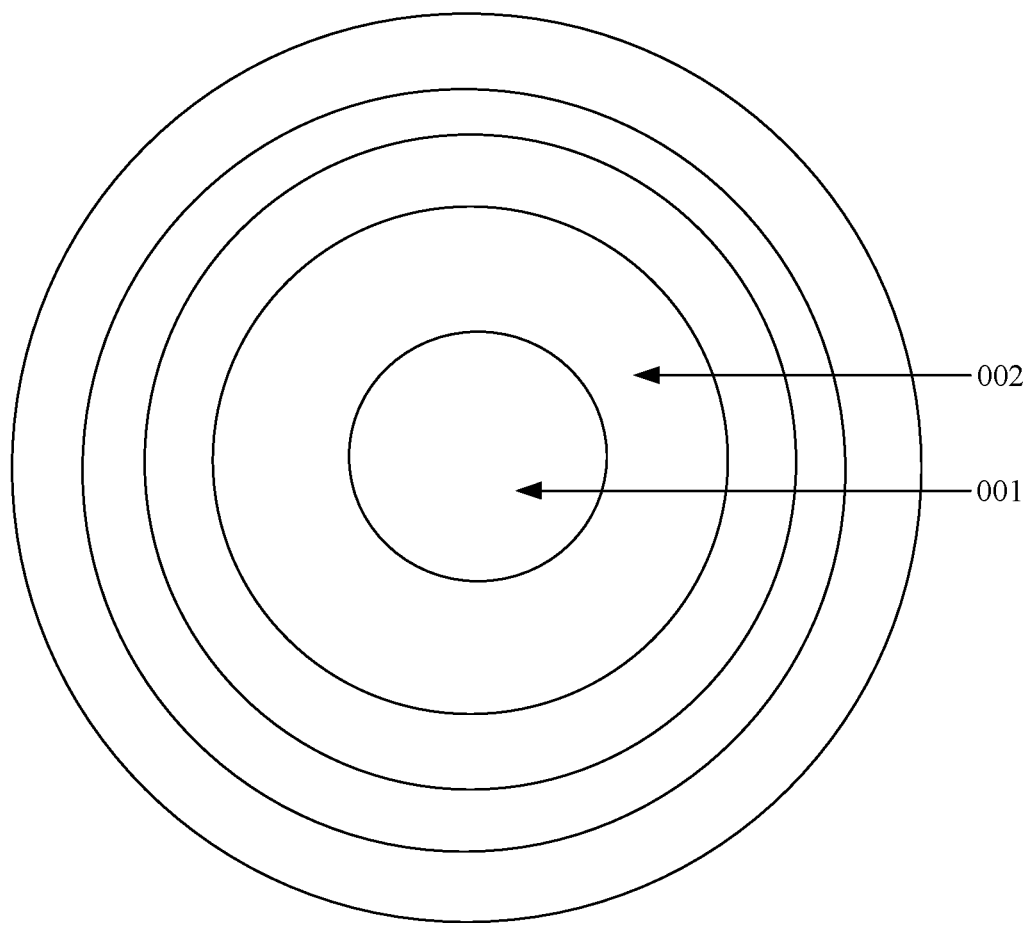
FIG. 1 is a front view of a Fresnel lens according to an embodiment of the present disclosure.
Figure 2:
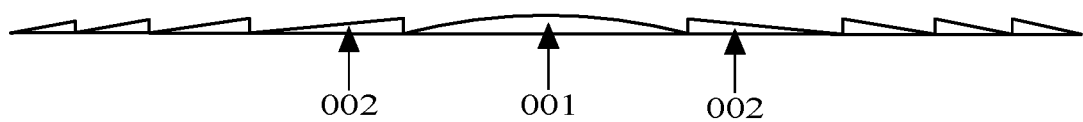
FIG. 2 is a section view of the Fresnel lens shown in FIG. 1.

Illustratively, FIG. 1 is a front view of a Fresnel lens according to an embodiment of the present disclosure, and FIG. 2 is a section view of the Fresnel lens shown in FIG. 1. Referring to FIGS. 1 and 2, one surface of the Fresnel lens is flat, and the other surface of the Fresnel lens is sawtoothed. The sawtoothed surface is a focusing surface of the Fresnel lens. The focusing surface includes a focusing circle 001 whose center coincides with the center of the Fresnel lens, and a plurality of focusing rings 002 disposed outside the focusing circle 001 and concentric with the focusing circle 001. The plurality of focusing rings 002 are distributed outside the focusing circle 001 in a direction distal from the focusing circle 001. The focusing circle 001 and the plurality of focusing rings 002 project toward the same surface. The convex surface of the focusing circle 001 is a circular arc surface; and the convex surface of the focusing ring 002 is an arc surface. Each of the convex surface of the focusing circle 001 and the convex surface of the focusing ring 002 has a curvature. The Fresnel lens achieves focusing by the focusing circle 001 and the focusing rings 002.

An embodiment of the present disclosure provides a dimming mirror. The dimming mirror may be implemented as a Fresnel lens, and a response wavelength of the dimming mirror may be adjusted, thereby facilitating the improvement of the flexibility of the dimming mirror.

Figure 3:
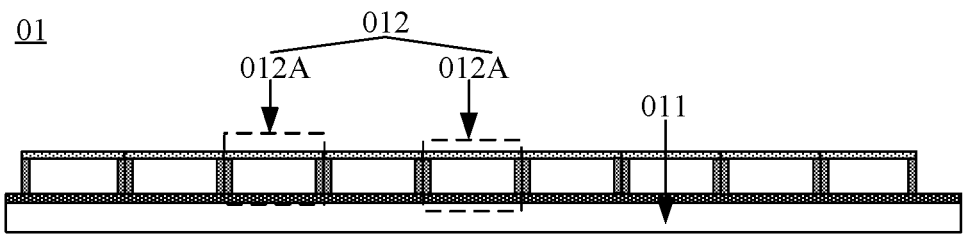
FIG. 3 is a schematic structure diagram of a dimming mirror according to the present disclosure.
Figure 4:
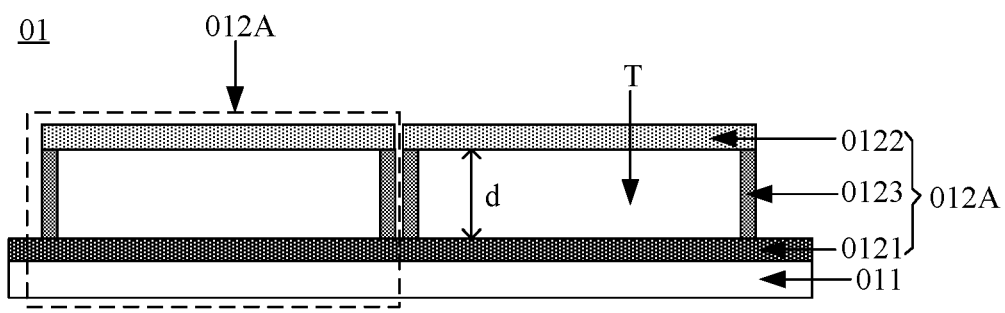
FIG. 4 is an enlarged view of a partial area of a dimming mirror according to an embodiment of the present disclosure.

Illustratively, referring to FIGS. 3 and 4, FIG. 3 shows a schematic structure diagram of a dimming mirror 01 according to the present disclosure, and FIG. 4 shows an enlarged view of a partial area of the dimming mirror 01 according to an embodiment of the present disclosure. Referring to FIGS. 3 and 4, the dimming mirror 01 includes a base substrate 011, and a dimming layer 012 disposed on the base substrate 011. The dimming layer 012 includes a plurality of dimming units 012A. Referring to FIG. 4, the dimming unit 012A includes a first driving structure 0121 and a second driving structure 0122 opposite to each other, and an elastic supporting structure 0123 disposed between the first driving structure 0121 and the second driving structure 0122. The first driving structure 0121, the second driving structure 0122 and the elastic supporting structure 013 enclose a dimming chamber T. The first driving structure 0121 and the second driving structure 0122 are configured to adjust a dimming angle of the dimming unit 012A by adjusting a gap width d of the dimming chamber T. The gap width d of the dimming chamber T may be a minimum distance between the first driving structure 0121 and the second driving structure 0122.

In summary, the dimming mirror according to the embodiment of the present disclosure includes the dimming layer including the plurality of dimming units. Each of the dimming units includes the first driving structure, the second driving structure and the elastic supporting structure. The first and second driving structures and the elastic supporting structure enclose the dimming chamber. The dimming angle of the dimming unit may be adjusted by using the first and second driving structures to adjust the gap width of the dimming chamber, such that a response wavelength of the dimming mirror is adjusted, thereby facilitating the improvement of the flexibility of the dimming mirror.

Optionally, the elastic supporting structure 0123 may be a cylindrical structure, and the first driving structure 0121 and the second driving structure 0122 are bridged to the two ends of the elastic supporting structure 0123 respectively, such that the first driving structure 0121, the second driving structure 0122 and the elastic supporting structure 013 may enclose the dimming chamber T conveniently. Optionally, the cross section of the elastic supporting structure 0123 may be in the shape of a ring (that is, the elastic supporting structure 0123 may be the cylindrical structure); or the cross section of the elastic supporting structure 0123 may be in the shape of a polygonal ring such as a three-sided ring, a four-sided ring or a five-sided ring, which is not limited in the embodiment of the present disclosure. The cross section of the elastic supporting structure 0123 is parallel to a surface of the base substrate 011. In the embodiment of the present disclosure, as shown in FIG. 4, each dimming unit 012A includes one elastic supporting structure 0123. It may be understood that FIG. 4 is merely exemplary. In actual products, each dimming unit 012A includes a plurality of columnar elastic supporting structures. The columnar elastic supporting structures may be arranged in an array, which is not limited in the embodiment of the present disclosure.

Optionally, the dimming chamber T may be an empty chamber; or an elastic refractive medium is provided in the dimming chamber T. The dimming chamber T being an empty chamber means that the dimming chamber T is filled with an air medium. The dimming chamber T may be filled with the elastic refractive medium. The elastic refractive medium may be an elastic medium having a refractive index different from that of air, and for example, may be a colloid, an ionic solution, or the like. The elastic refractive medium may change the refractive index of the dimming chamber T. It is easy to understand that the dimming chamber T filled with different elastic refraction media has different refractive indexes. As shown in FIG. 4, the embodiment of the present disclosure takes an example in which the dimming chamber T is the empty chamber for illustration.

Figure 5:
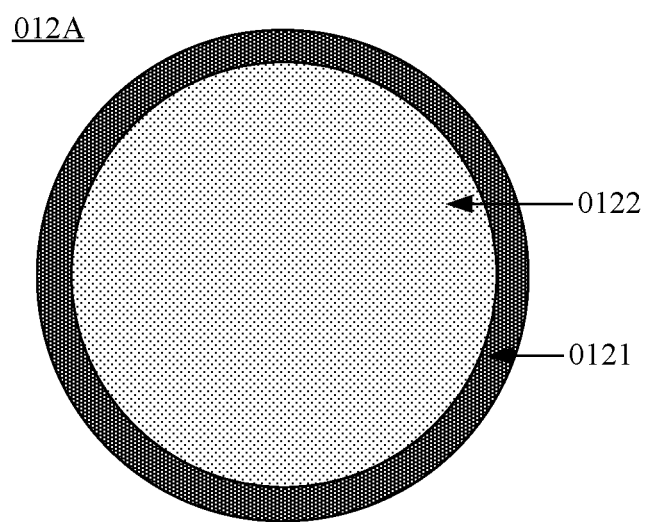
FIG. 5 is a front view of a dimming unit according to an embodiment of the present disclosure.

Optionally, the first driving structure 0121 may be plate-shaped, and the first driving structures 0121 of all the dimming units 012A may be formed into an integrated structure. The second driving structure 0122 may be block-shaped, and the shape of the cross section of the second driving structure 0122 may include at least one of a circle and a polygon. Alternatively, both the first driving structure 0121 and the second driving structure 0122 may be block-shaped; and each of the shapes of the cross sections of the first driving structure 0121 and the second driving structure 0122 may include at least one of the circle and the polygon. The shapes of the cross sections of both the first driving structure 0121 and the second driving structure 012 may be the same or different. In the embodiment of the present disclosure, the cross sections of both the first driving structure 0121 and the second driving structure 0122 are parallel to the surface of the base substrate 011. Illustratively, FIG. 5 shows a front view of a dimming unit 012A according to an embodiment of the present disclosure. As shown in FIG. 5, the shapes of the cross sections of both the first driving structure 0121 and the second driving structure 0122 are circular; and an orthographic projection of the second driving structure 0122 on the first driving structure 0121 falls within the first driving structure 0121.

Figure 6:
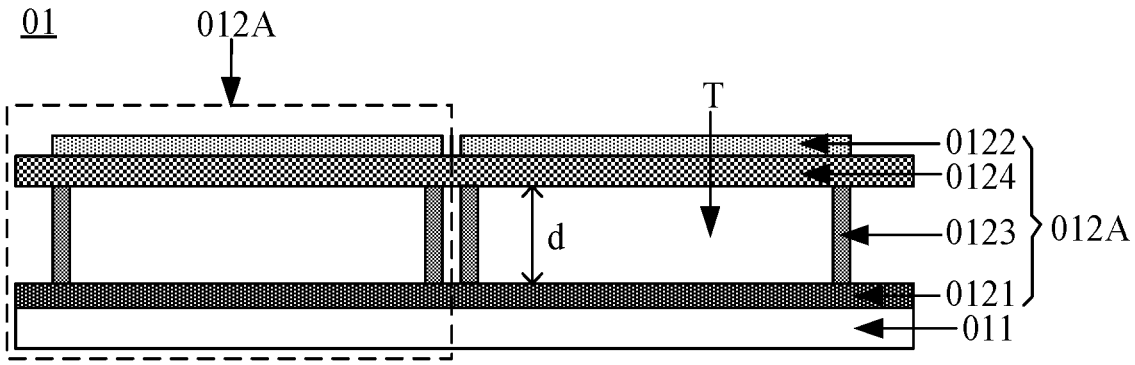
FIG. 6 is an enlarged view of a partial area of another dimming mirror according to an embodiment of the present disclosure.

Optionally, FIG. 6 shows an enlarged view of a partial area of another dimming mirror 01 according to an embodiment of the present disclosure. Referring to FIG. 6, on the basis of FIGS. 3 and 4, the dimming unit 012A may further include a carrier film 0124 disposed on a side of the elastic supporting structure 0123 distal from the first driving structure 0121. The second driving structure 0122 is disposed on a side of the carrier film 0124 distal from the first driving structure 0121, that is, the carrier film 0124 is disposed between the elastic supporting structure 0123 and the second driving structure 0122. As shown in FIG. 6, the first driving structure 0121, the elastic supporting structure 0123, the carrier film 0124, and the second driving structure 0122 are distributed in a direction distal from the base substrate 011.

Optionally, the carrier films 0124 of all the dimming units 012A may be formed into an integrated structure, or the carrier films 0124 of each of the dimming units 012A may be independent of each other. As shown in FIG. 6, the embodiment of the present disclosure takes an example in which the carrier films 0124 of all the dimming units 012A are formed into an integrated structure for illustration. The carrier film 0124 may carry the second driving structure 0122. When the carrier films 0124 of all the dimming units 012A are formed into the integrated structure and the second driving structure 0122 is block-shaped, the carrier film 0124 helps avoid the failure of the lapped joint between the second driving structure 0122 and the elastic supporting structure 0123, thereby facilitating the enclosure of the dimming chamber T by the first driving structure 0121, the second driving structure 0122, and the elastic supporting structure 0123. Optionally, the carrier film 0124 may be made of a light-transmitting material. For example, the carrier film 0124 may be made of one or a combination of more of silicon oxide (SiOx), silicon nitride (SiNx), and silicon oxynitride (SiOxNx).

Figure 7:
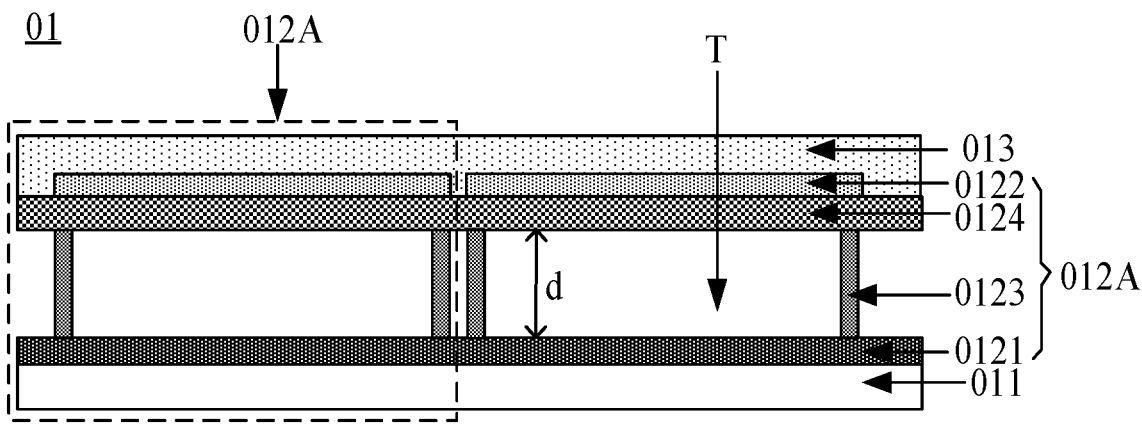
FIG. 7 is an enlarged view of a partial area of yet another dimming mirror according to an embodiment of the present disclosure.

Optionally, FIG. 7 shows an enlarged view of a partial area of yet another dimming mirror 01 according to an embodiment of the present disclosure. Referring to FIG. 7, on the basis of FIG. 6, the dimming mirror 01 may further include a protective layer 013 disposed on a side of the dimming layer 012 distal from the base substrate 011. The protective layer 013 protects the dimming layer 012 from being in direct contact with the outside, thereby reducing the probability of damage to the dimming layer 012 caused by an outer factor. Optionally, the protective layer 013 may be made of a light-transmitting material with a high refractive index. For example, the protective layer 013 may be made of an organic light-transmitting material.

Figure 8:
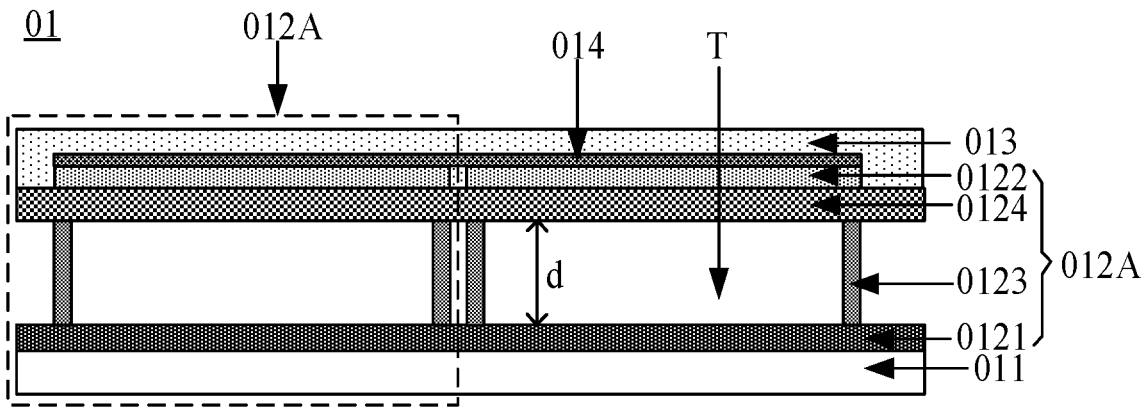
FIG. 8 is an enlarged view of a partial area of still another dimming mirror according to an embodiment of the present disclosure.

Optionally, FIG. 8 shows an enlarged view of a partial area of still another dimming mirror 01 according to an embodiment of the present disclosure. Referring to FIG. 8, on the basis of FIG. 7, the dimming mirror 01 may further include a reflective layer 014 disposed on a side of the dimming layer 012 distal from the base substrate 011. The protective layer 013 is disposed on a side of the reflective layer 014 distal from the base substrate 011, that is, the reflective layer 014 is disposed between the protective layer 013 and the dimming layer 012. The reflective layer 014 is capable of reflecting light, such that light incident from the side where the base substrate 011 is disposed is reflected out from the base substrate 011. The dimming mirror 01 shown in FIG. 8 may be a reflective dimming mirror. Optionally, the reflective layer 014 may be a metal thin film, and for example, may be a metal silver thin film.

Optionally, the dimming unit 012A may be an electric driving dimming unit. Both the first driving structure 0121 and the second driving structure 0122 may be driving electrodes. Out-of-phase voltages may be applied onto the first driving structure 0121 and the second driving structure 0122, such that the first driving structure 0121 and the second driving structure 0122 attract each other to adjust the gap width d of the dimming chamber T, thereby adjusting the dimming angle of the dimming unit 012A. Or, optionally, the dimming unit 012A may be a magnetic driving dimming unit. Both the first driving structure 0121 and the second driving structure 0122 may be electromagnetic driving structures, and may include electromagnetic coils. Electrical signals may be applied to the electromagnetic coils to enable the first driving structure 0121 and the second driving structure 0122 to generate electromagnetic induction to attract each other, such that the gap width d of the dimming chamber T is adjusted, thereby adjusting the dimming angle of the dimming unit 012A. Optionally, the dimming unit 012A may be a thermal expansion dimming unit. At least one of the first driving structure 0121 and the second driving structure 0122 may be a thermal expansion driving structure, and may be heated to change its/their temperature(s), such that at least one of the first driving structure 0121 and the second driving structure 0122 is subjected to thermal expansion to adjust the gap width d of the dimming chamber T, thereby adjusting the dimming angle of the dimming unit 012A. Or, optionally, the dimming unit 012A may be a pneumatic dimming unit. At least one of the first driving structure 0121 and the second driving structure 0122 may be a pneumatic driving structure. Air pressure may be applied to at least one of the first driving structure 0121 and the second driving structure 0122 to enable the first driving structure 0121 and the second driving structure 0122 to be proximal to each other, such that the gap width d of the dimming chamber T is adjusted, thereby adjusting the dimming angle of the dimming unit 012A.

Figure 9:
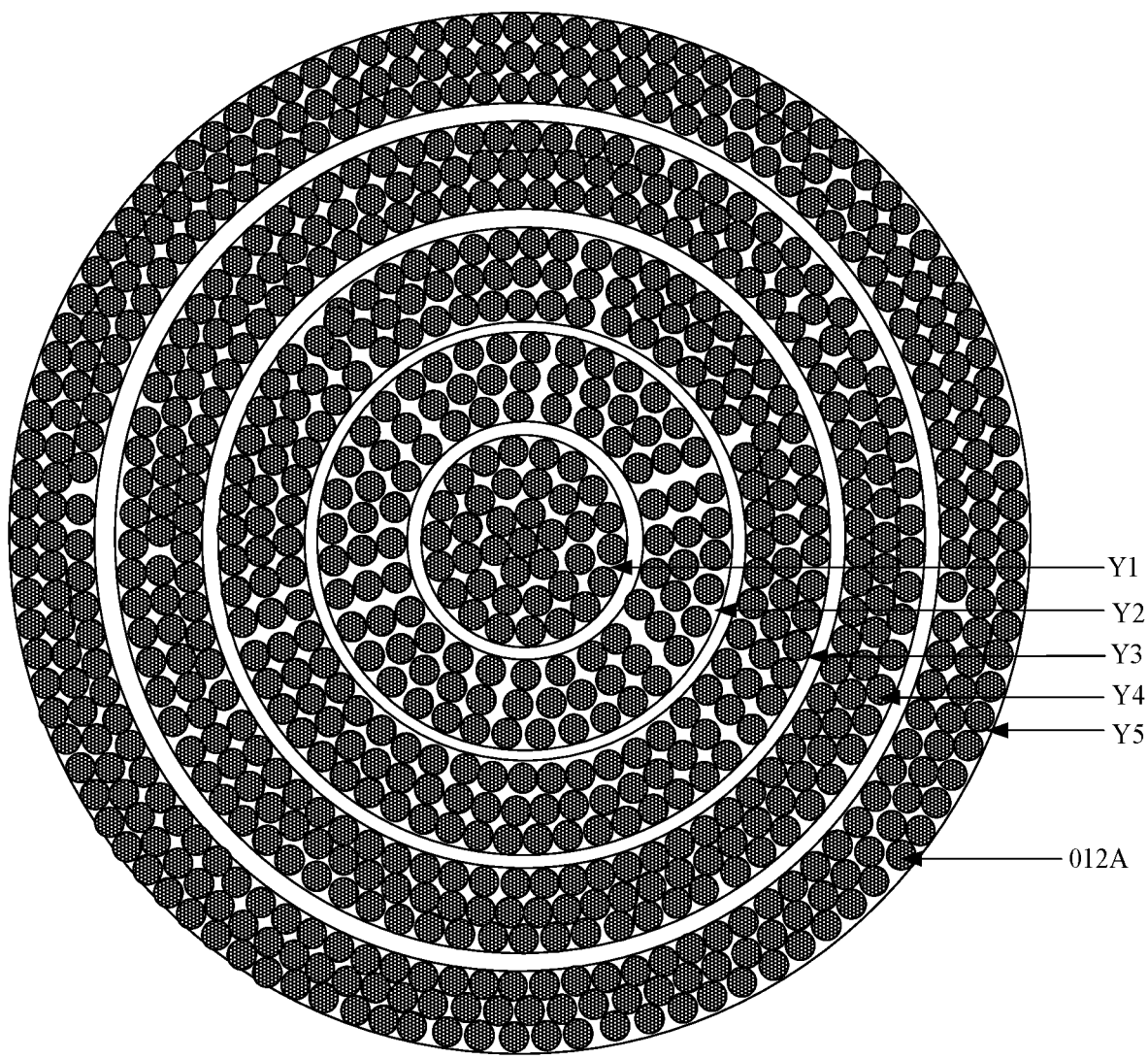
FIG. 9 is a front view of a dimming mirror according to an embodiment of the present disclosure.

Optionally, FIG. 9 shows a front view of a dimming mirror 01 according to an embodiment of the present disclosure. Referring to FIG. 9, the dimming mirror 01 includes a plurality of dimming units 012A. The plurality of dimming units 012A are arranged in an array to form a plurality of dimming rings and a dimming circle Y1 which are concentric. The plurality of dimming rings are equally spaced apart outside the dimming circle Y1 in a direction distal from the dimming circle Y1. A plurality of dimming units 012A are distributed on each dimming ring. Each dimming ring may include a plurality of sub-dimming rings which are concentric and may be in contact with each other. The width of each sub-dimming ring may be equal to the width of the dimming unit 012A; and the width of the dimming unit 012A may be the size of the dimming unit 012A in a direction parallel to the base substrate 011. When the front view of the shape of the dimming unit 012A (namely, the shape of the dimming unit 012A observed in the front direction) is circular, the width of the dimming unit 012A is also the diameter of the dimming unit 012A. Illustratively, as shown in FIG. 9, the plurality of dimming rings include a dimming ring Y2, a dimming ring Y3, a dimming ring Y4 and a dimming ring Y5 which are equally spaced apart outside the dimming circle Y1 in a direction distal from the dimming circle Y1. A plurality of dimming units 012A are distributed on the dimming circle Y1. A plurality of dimming units 012A are distributed on each of the dimming rings Y2, Y3, Y4 and Y5. Each of the dimming rings Y2, Y3, Y4 and Y5 may include three sub-dimming rings (not shown in FIG. 9) which are concentric and which are in contact with each other. The width of each sub-dimming ring may be equal to the width of the dimming unit 012A, and the width of each dimming ring may be equal to the sum of the widths of the three sub-dimming rings.

Figure 10:
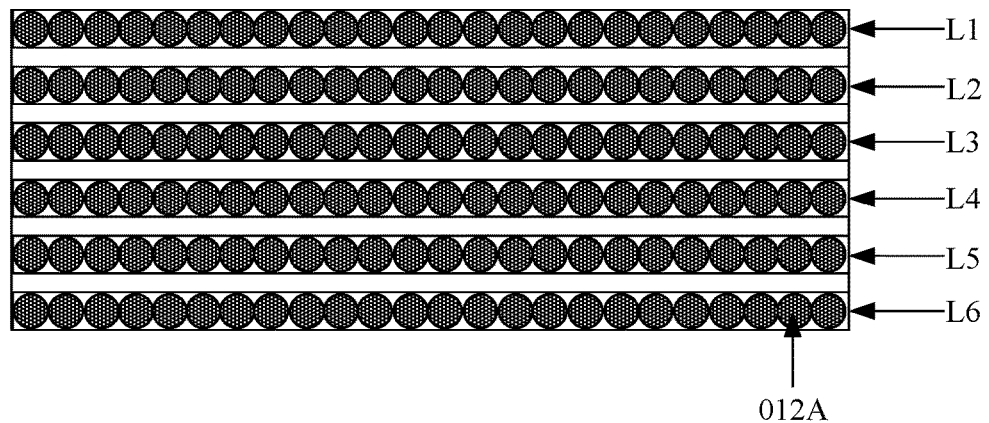
FIG. 10 is a front view of another dimming mirror according to an embodiment of the present disclosure.

Optionally, FIG. 10 shows a front view of another dimming mirror 01 according to an embodiment of the present disclosure. Referring to FIG. 10, the dimming mirror 01 includes a plurality of dimming units 012A. The plurality of dimming units 012A are arranged in an array to form a plurality of linear dimming strips which are parallel to each other and which are equally spaced apart. A plurality of dimming units 012A are distributed on each linear dimming strip; and each linear dimming strip may include one or more sub-dimming strips (not shown in FIG. 10) parallel to each other. Illustratively, FIG. 10 takes an example in which each linear dimming strip includes one sub-dimming strip as an example for illustration. The plurality of linear dimming strips include a linear dimming strip L1, a linear dimming strip L2, a linear dimming strip L3, a linear dimming strip L4, a linear dimming strip L5 and a linear dimming strip L6 which are equally spaced. A plurality of dimming units 012A are arranged on each of the linear dimming strips L1, L2, L3, L4, L5 and L6. The width of each linear dimming strip may be equal to the width of the dimming unit 012A. When the front view of the shape of the dimming unit 012A is circular, the width of the dimming unit 012A is also the diameter of the dimming unit 012A.

Figure 11:
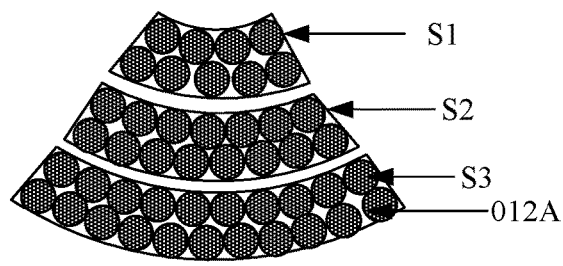
FIG. 11 is a front view of still another dimming mirror according to an embodiment of the present disclosure.

Optionally, FIG. 11 shows a front view of still another dimming mirror 01 according to an embodiment of the present disclosure. Referring to FIG. 11, the dimming mirror 01 includes a plurality of dimming units 012A. The plurality of dimming units 012A are arranged in an array to form a plurality of arc-shaped dimming strips which share a common circle center and which are equally spaced apart on same fan-shaped area. A plurality of dimming units 012A are distributed on each arc-shaped dimming strip. Each arc-shaped dimming strip may include a plurality of sub-dimming strips (not shown in FIG. 11) which are concentric and may be in contact with each other. The width of each sub-dimming strip may be equal to the width of the dimming unit 012A. When the front view of the shape of the dimming unit 012A is circular, the width of the dimming unit 012A is also the diameter of the dimming unit 012A. Illustratively, as shown in FIG. 11, the plurality of arc-shaped dimming strips include an arc-shaped dimming strip S1, an arc-shaped dimming strip S2, and an arc-shaped dimming strip S3 which are equally spaced apart on the same fan-shaped area and which share a common circle center. The circle center may be the circle center of a circle of the fan-shaped area for the arc-shaped dimming strips S1, S2 and S3. A plurality of dimming units 012A are distributed on each of the arc-shaped dimming strips S1, S2 and S3. Each of the arc-shaped dimming strips S1, S2 and S3 may include two arc-shaped sub-dimming strips (not shown in FIG. 11) in contact with each other. The width of each arc-dimming strip may be equal to the width of the dimming unit 012A. When the front view of the shape of the dimming unit 012A is circular, the width of the dimming unit 012A is also the diameter of the dimming unit 012A. The width of each arc-shaped dimming strip may be equal to the sum of the widths of the two arc-shaped sub-dimming strips in the arc-shaped dimming strip.

Optionally, the dimming mirror 01 may include any one of a biconvex lens, a plano-convex lens and a plano-concave lens. The biconvex lens refers to a lens having the two surfaces being convex. The plano-convex lens refers to a lens having one surface being flat and the other surface being convex. The plano-concave lens refers to a lens having one surface being flat and the other surface being concave. Those skilled in the art may easily understand that when the dimming mirror 01 includes a reflective layer 014, the dimming mirror 01 may be a reflective mirror; and the dimming mirror 01 may be any one of a biconvex reflective mirror, a plano-convex reflective mirror and a plano-concave reflective mirror. The biconvex reflective mirror refers to a reflective mirror having the two surfaces being convex. The plano-convex reflective mirror refers to a reflective mirror having one surface being flat and the other surface being convex. The plano-concave reflective mirror refers to a reflective mirror having one surface being flat and the other surface being concave.

Optionally, the dimming mirror 01 according to the embodiment of the present disclosure may further include a control component which may control the first driving structure 0121 and the second driving structure 0122 to adjust the gap width of the dimming chamber T. Illustratively, when each of the first driving structure 0121 and the second driving structure 0122 is a driving electrode, the control component may be electrically connected to the first driving structure 0121 and the second driving structure 0122 to apply an electrical signal to each of the first driving structure 0121 and the second driving structure 0122. When each of the first driving structure 0121 and the second driving structure 0122 is an electromagnetic driving structure, the control component may be electrically connected to electromagnetic induction coils of both the first driving structure 0121 and the second driving structure 0122 to apply an electrical signal to each of the first driving structure 0121 and the second driving structure 0122. When each of the first driving structure 0121 and the second driving structure 0122 is a thermal expansion driving structure, the control component may control a heating device to heat at least one of the first driving structure 0121 and the second driving structure 0122 to change its/their temperature(s). When each of the first driving structure 0121 and the second driving structure 0122 is a pneumatic driving structure, the control component may control a pressurizing device to apply air pressure to at least one of the first driving structure 0121 and the second driving structure 0122.

Optionally, each of the first driving structure 0121 and the second driving electrode 0122 may be made of a transparent conductive material. For example, each of the first driving structure 0121 and the second driving electrode 0122 may be made of one or a combination of indium tin oxide (ITO), indium zinc oxide (IZO) and aluminum-doped zinc oxide (ZnO:Al). The elastic supporting structure 0123 may be made of an inorganic elastic material which may be, for example, one or a combination of SiOx, SiNx and SiOxNx. Alternatively, the elastic supporting structure 0123 may be made of an organic elastic material which may be, for example, polydimethylsiloxane (PDMS).

It is not difficult to understand from the above description that, in the embodiment of the present disclosure, a driving force is applied to each dimming unit 012A through the first driving structure 0121 and the second driving structure 0122 of the dimming unit 012A to adjust the gap width d of the dimming chamber T of the dimming unit 012A, such that the dimming angle of the dimming unit 012A is adjusted, thereby adjusting the response wavelength of the dimming mirror 01 and enabling the dimming mirror 01 to have different response wavelengths. Those skilled in the art may easily understand that when no driving force is applied to each dimming unit 012A, the dimming unit 012A is in an initial state, the gap width d of the dimming chamber T does not change. The heights of all the dimming units 012A in the initial state may be equal. When the same driving force is applied to any two of the dimming units 012A, the gap widths d of the dimming chambers T of the two dimming units 012A change. As the change amounts of the gap widths d of the dimming chambers T of the two dimming units 012A are the same, the heights of the two dimming units 012A are still the same after the gap widths change. The height of the dimming unit 012A may be a size of the dimming unit 012A in a direction perpendicular to the base substrate 011. When each of the first driving structure 0121 and the second driving structure 0122 is a driving electrode, out-of-phase voltages may be applied to the first driving structure 0121 and the second driving structure 0122 to apply a driving force to the dimming unit 012A.

A dimming principle of the dimming mirror shown in FIG. 9 will be briefly described below with reference to FIGS. 12 and 13.

Figure 12:
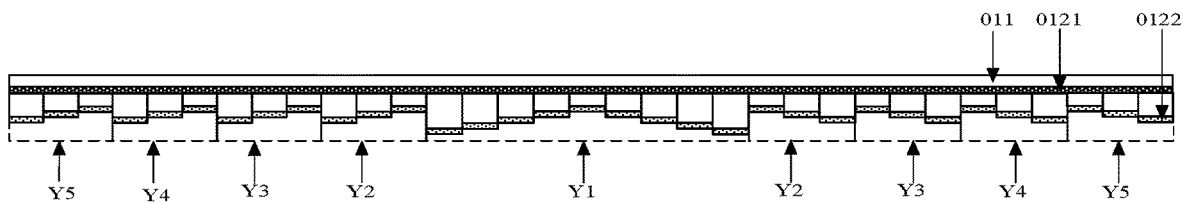
FIG. 12 is a section view of the dimming mirror shown in FIG. 9.
Figure 13:
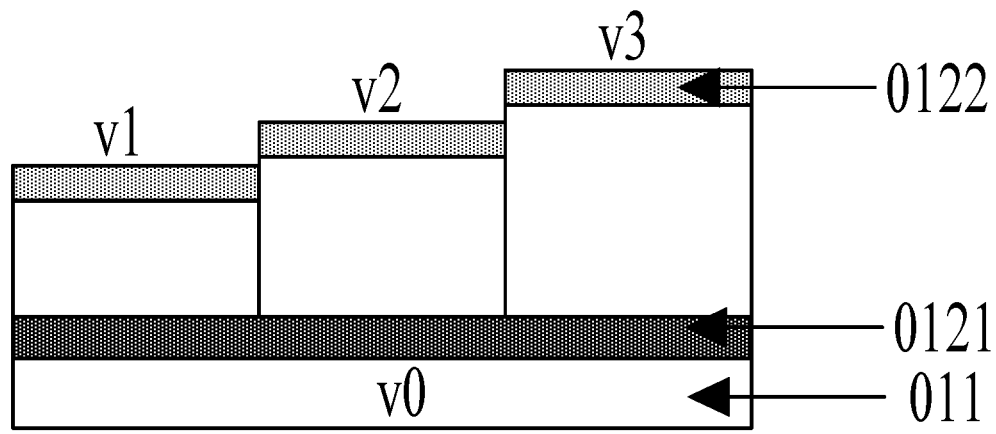
FIG. 13 is an enlarged view of a dimming ring of the dimming mirror shown in FIG. 12.

FIG. 12 shows a section view of the dimming mirror 01 shown in FIG. 9. Referring to FIG. 12 in combination with FIG. 9, the dimming mirror 01 includes a dimming circle Y1 as well as a dimming ring Y2, a dimming ring Y3, a dimming ring Y4 and a dimming ring Y5 which are equally spaced apart outside the dimming circle Y. FIG. 13 is an enlarged view of the dimming ring Y2 of the dimming mirror 01 shown in FIG. 12. Referring to FIGS. 12 and 13, the dimming ring Y2 includes three sub-dimming rings. In the initial state, all dimming units 012A in the three sub-dimming rings have the same height. The same driving force may be applied to the dimming units 012A in the same sub-dimming ring in the dimming ring Y2, and different driving forces may be applied to the dimming units 012A in the different sub-dimming rings in the dimming ring Y2, such that all the dimming units 012A in the same sub-dimming ring have the same height, and the dimming units 012A in the different sub-dimming rings have different heights. In this way, the heights of the different sub-dimming rings may be different. A dimming angle of each sub-dimming ring may be adjusted by adjusting the height of the sub-dimming ring, such that the dimming angle of the dimming ring Y2 is adjusted. The response wavelength of the dimming mirror 01 is adjusted by adjusting the dimming angle of each dimming ring. Illustratively, by adjusting the dimming angle of the dimming mirror 01 shown in FIG. 9, the dimming mirror 01 may be a biconvex lens, a plano-convex lens or a plano-concave lens.

Illustratively, the embodiment of the present disclosure takes an example in which both the first driving structure 0121 and the first driving structure 0122 are driving electrodes. In the initial state, the heights of all the dimming units 012A of the dimming mirror 01 are equal. Referring to FIGS. 12 and 13, out-of-phase voltages may be applied to the first driving structure 0121 and the second driving structure 0122 of each dimming unit 012A of the dimming ring Y2, such that the first driving structure 0121 and the second driving structure 0122 of the dimming unit 012A attract each other. As the second driving structure 0122 moves towards the first driving structure 0121, the gap width d of the dimming chamber of the dimming unit 012A is decreased. Illustratively, in the dimming mirror 01, the first driving structures 0121 of all the dimming units 012A may be formed into an integrated structure. As shown in FIG. 13, a voltage v0 may be applied to the first driving structure 0121. Voltages v1, v2, and v3 may be applied to the second driving structures 0122 of the dimming units 012A in the three sub-dimming rings of the dimming ring Y2 respectively, and are in-phase voltages. The voltage v0 is an out-of-phase voltage with respect to the voltages v1, v2, and v3. In this way, the first driving structure 0121 and the second driving structure 0122 of each dimming unit 012A attract each other; attractive forces between the first driving structures 0121 and the second driving structures 0122 in the same sub-dimming ring are the same; and attractive forces between the first driving structures 0121 and the second driving structures 0122 in the different sub-dimming rings are different. The heights of the three sub-dimming rings of the dimming ring Y2 may be as shown in FIG. 13. A side of the dimming ring Y2 distal from the base substrate 011 has a curvature.

In the embodiment of the present disclosure, driving forces may be applied to different dimming units 012A of the dimming mirror 01 shown in FIG. 9 to adjust the heights of the dimming units 012A. When the heights of the dimming units 012A of the dimming mirror 01 shown in FIG. 9 meet a design requirement of the Fresnel lens, the dimming mirror 01 shown in FIG. 9 may be implemented as the Fresnel lens. It is easy to understand that when the driving forces enable the arrangement of the dimming units 012A of the dimming mirror 01 to meet a design requirement of another lens, the dimming mirror 01 shown in FIG. 9 may be implemented as this lens, which is not limited in the embodiment of the present disclosure.

In summary, the dimming mirror according to the embodiment of the present disclosure includes the dimming layer including the plurality of dimming units. Each of the dimming units includes the first driving structure, the second driving structure and the elastic supporting structure. The first and second driving structures and the elastic supporting structure enclose the dimming chamber. The dimming angle of the dimming unit may be adjusted by using the first and second driving structures to adjust the gap width of the dimming chamber, such that a response wavelength of the dimming mirror is adjusted, thereby facilitating the improvement of the flexibility of the dimming mirror. It may be understood that not only is the gap width of the dimming chamber adjusted through the first driving structure and the second driving structure, but also a focal length and an optical aperture (namely, the diameter of an optical hole) of the dimming mirror may be adjusted.

The embodiment of the present disclosure implements the dimming mirror on the basis of micro-electro-mechanical system (MEMS) technology. The gap width of the dimming chamber is adjusted through the driving force to achieve periodic array regulation, such that the focal length and the response wavelength of the dimming mirror are changed, thereby enabling the dimming mirror to achieve multi-band selection and a zoom function. As being capable of achieving functions of multiple lenses through driving, the dimming mirror according to the embodiment of the present disclosure facilitates the reduction of the manufacturing cost of different lenses, and is competitive in the market.

Figure 14:
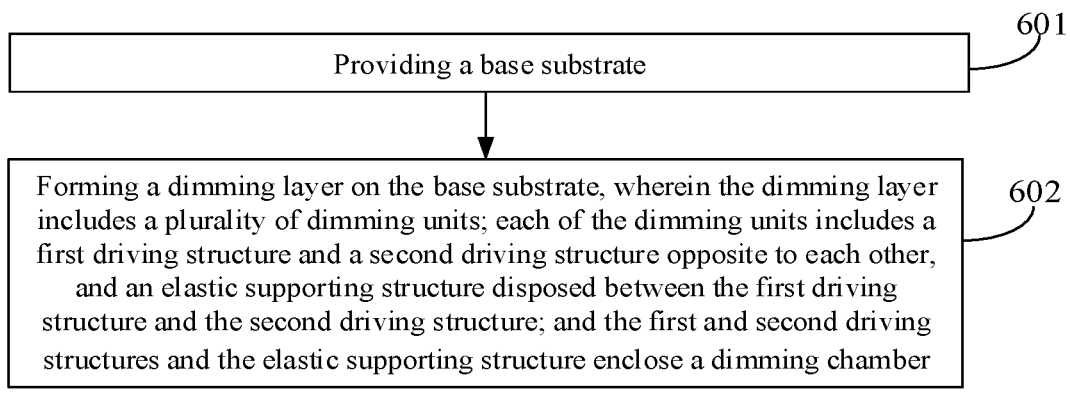
FIG. 14 is a flowchart of a dimming mirror manufacturing method according to an embodiment of the present disclosure.

FIG. 14 shows a flowchart of a dimming mirror manufacturing method according to an embodiment of the present disclosure. The method may be employed to manufacture any one of the dimming mirrors 01 shown in FIG. 3, FIG. 4, and FIG. 6 to FIG. 11. Referring to FIG. 14, the method may include the following steps.

In step 601, a base substrate is provided.

In step 602, a dimming layer is formed on the base substrate, wherein the dimming layer includes a plurality of dimming units; each of the dimming units includes a first driving structure and a second driving structure opposite to each other, and an elastic supporting structure disposed between the first driving structure and the second driving structure; and the first and second driving structures and the elastic supporting structure enclose a dimming chamber.

In summary, according to the dimming mirror manufacturing method according to the embodiment of the present disclosure, the dimming mirror includes the dimming layer including the plurality of dimming units. Each of the dimming units includes the first driving structure, the second driving structure and the elastic supporting structure. The first and second driving structures and the elastic supporting structure enclose the dimming chamber. The dimming angle of the dimming unit may be adjusted by using the first and second driving structures to adjust the gap width of the dimming chamber, such that a response wavelength of the dimming mirror is adjusted, thereby facilitating the improvement of the flexibility of the dimming mirror.

Figure 15:
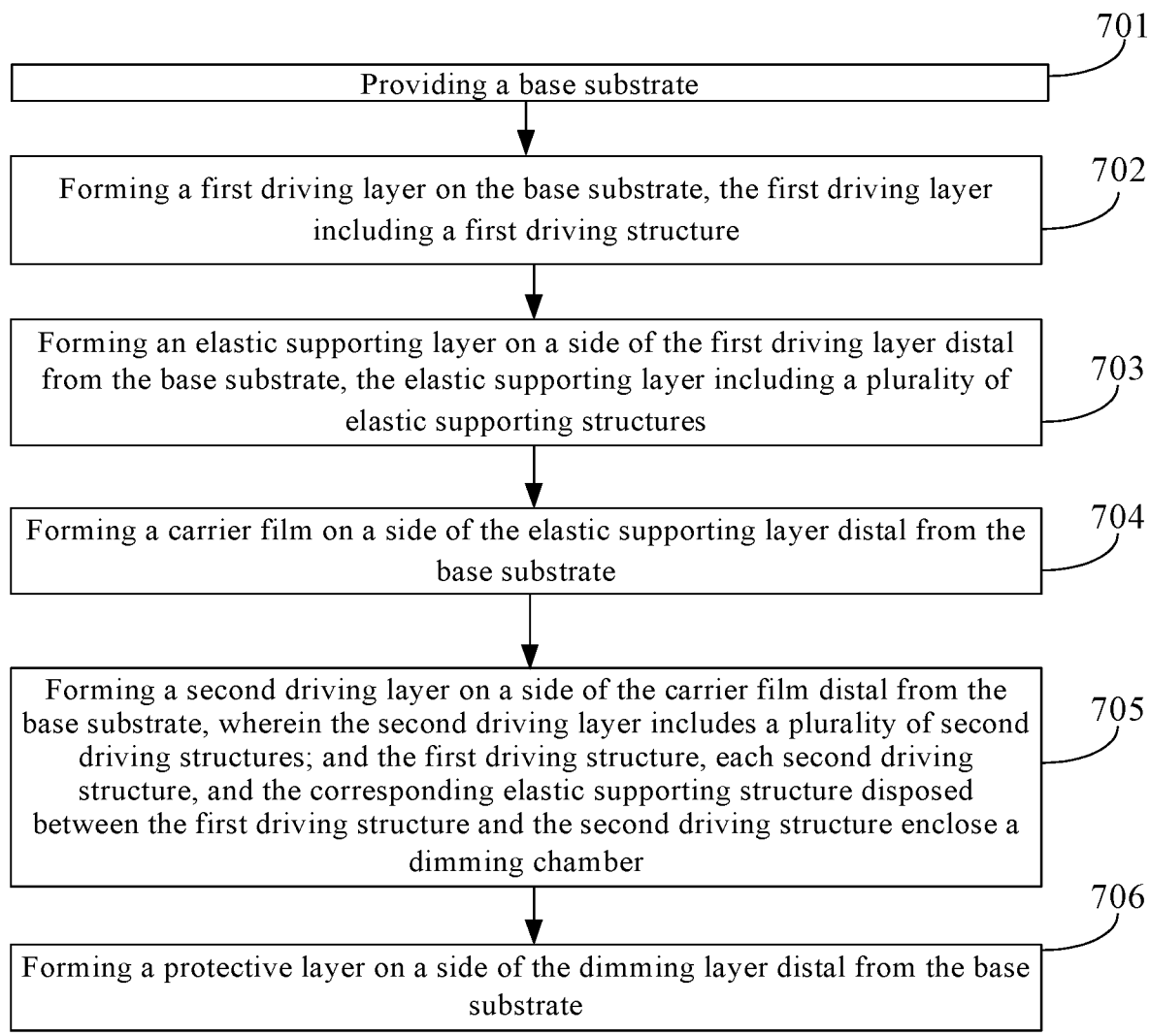
FIG. 15 is a flowchart of another dimming mirror manufacturing method according to an embodiment of the present disclosure.

FIG. 15 shows a flowchart of another dimming mirror manufacturing method according to an embodiment of the present disclosure. The method may be employed to manufacture any one of the dimming mirrors 01 shown in FIG. 3, FIG. 4, and FIG. 6 to FIG. 11. The present embodiment takes the dimming mirror 01 manufactured in FIG. 7 as an example for illustration. Referring to FIG. 15, the method may include the following steps.

In step 701, a base substrate is provided.

The base substrate may be a transparent base plate, and for example, may be a rigid base plate made of non-metallic light-guiding material having a certain rigidity, such as glass, quartz or transparent resin. Illustratively, the base substrate may be a glass base substrate having a high light transmission.

In step 702, a first driving layer is formed on the base substrate, and includes a first driving structure.

Figure 16:
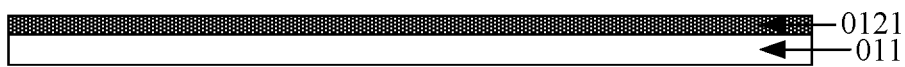
FIG. 16 is a schematic diagram after a first driving layer is formed on a base substrate according to an embodiment of the present disclosure.

FIG. 16 is a schematic diagram after a first driving layer is formed on the base substrate 011 according to an embodiment of the present disclosure. Referring to FIG. 16, the first driving layer includes a plate-shaped first driving structure 0121. Optionally, the first driving structure 0121 may be made of one or a combination of ITO, IZO, and ZnO:Al. Illustratively, an ITO material layer may be formed on the base substrate 011 by any one of processes such as deposition, coating and sputtering, and is processed through a one-step patterning process to obtain the first driving layer.

Those skilled in the art may easily understand that the first driving structure 0121 shown in FIG. 16 is exemplary. In actual products, the first driving layer may also include a plurality of block-shaped first driving structures 0121 which may be independent of each other, which is not limited in the embodiment of the present disclosure.

In step 703, an elastic supporting layer is formed on a side of the first driving layer distal from the base substrate, and includes a plurality of elastic supporting structures.

Figure 17:
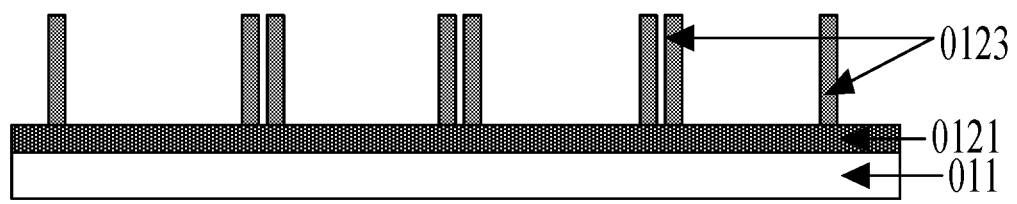
FIG. 17 is a schematic diagram after an elastic supporting layer is formed on a side of the first driving layer distal from the base substrate according to an embodiment of the present disclosure.

FIG. 17 is a schematic diagram after an elastic supporting layer is formed on a side of the first driving layer distal from the base substrate 011 according to an embodiment of the present disclosure. Referring to FIG. 17, the elastic supporting layer includes a plurality of elastic supporting structures 0123. The elastic supporting structure 0123 may be of a cylindrical structure. Optionally, the elastic supporting structure 0123 may be made of an inorganic elastic material or an organic elastic material. For example, the inorganic elastic material may be one or a combination of SiOx, SiNx and SiOxNx; and the organic elastic material may be PDMS. Illustratively, a PDMS material layer may be formed on a side of the first driving layer distal from the base substrate 011 by any one of processes such as deposition, coating and sputtering, and is processed through the one-step patterning process to obtain the elastic supporting layer.

In step 704, a carrier film is formed on a side of the elastic supporting layer distal from the base substrate.

Figure 18:
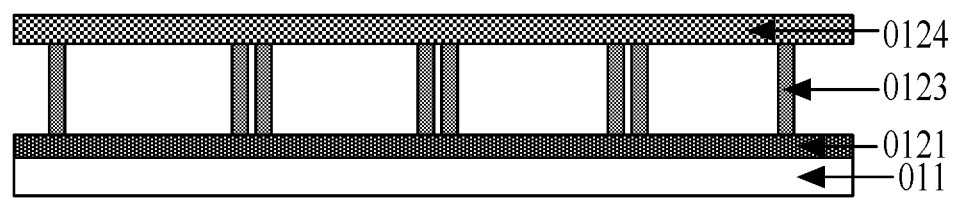
FIG. 18 is a schematic diagram after a carrier film is formed on a side of the elastic supporting layer distal from the base substrate according to an embodiment of the present disclosure.

FIG. 18 is a schematic diagram after a carrier film 0124 is formed on a side of the elastic supporting layer distal from the base substrate 011 according to an embodiment of the present disclosure. The carrier film 0124 may be a light-transmitting film. Optionally, the carrier film 0124 may be attached to the side of the elastic supporting layer distal from the base substrate 011 through an optical adhesive. Illustratively, the side of each elastic supporting structure 0123 distal from the base substrate 011 may be coated with the optical adhesive, and the carrier film 0124 is bonded to the elastic supporting structure 0123 by the carrier film 0124.

In step 705, a second driving layer is formed on a side of the carrier film distal from the base substrate, and includes a plurality of second driving structures, wherein the first driving structure, each second driving structure, and the corresponding elastic supporting structure disposed between the first driving structure and the second driving structures enclose dimming chambers.

Figure 19:
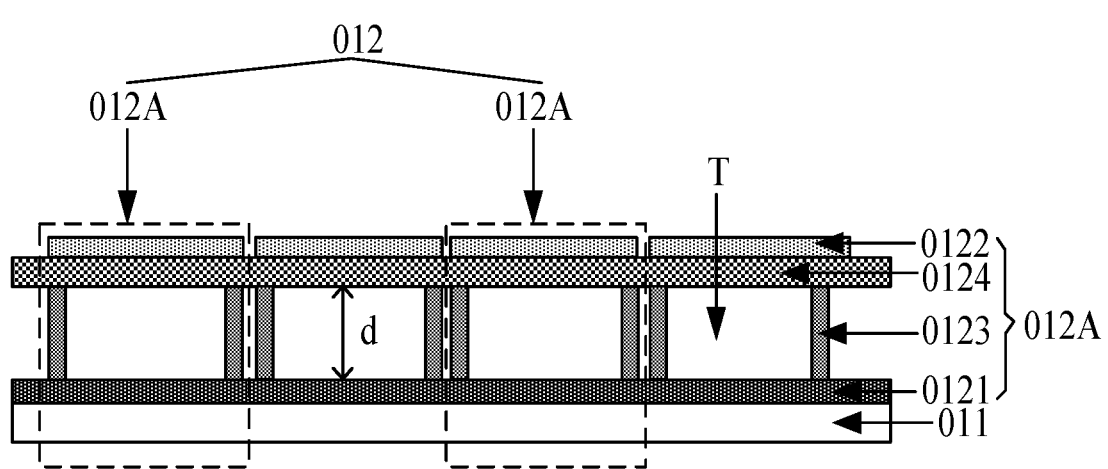
FIG. 19 is a schematic diagram after a second driving layer is formed on a side of the carrier film distal from the base substrate according to an embodiment of the present disclosure.

FIG. 19 shows a schematic diagram after a second driving layer is formed on a side of the carrier film 0124 distal from the base substrate 011 according to an embodiment of the present disclosure. Referring to FIG. 19, the second driving layer includes a plurality of second driving structures 0122. The first driving structure 0121, each second driving structure 0122, and the corresponding elastic supporting structure 0123 disposed between the first driving structure 0121 and the second driving structure 0122 enclose a dimming chamber T. The first driving structure 0121, each second driving structure 0122, the corresponding elastic supporting structure 0123 disposed between the first driving structure 0121 and the second driving structure 0122, and the dimming chamber T enclosed by the first driving structure 0121, the second driving structure 0122 and the corresponding elastic supporting structure 0123 disposed between the first driving structure 0121 and the second driving structure 0122 form a dimming unit 012A. A plurality of dimming units 012A form a dimming layer 012.

Optionally, the second driving structure 0122 may be made of one or a combination of ITO, IZO, and ZnO:Al. Illustratively, an ITO material layer may be formed on a side of the carrier film 0124 distal from the base substrate 011 by any one of processes such as deposition, coating and sputtering, and is processed through the one-step patterning process to obtain the second driving layer.

In step 706, a protective layer is formed on a side of the dimming layer distal from the base substrate.

The schematic diagram after the protective layer 013 is formed on the side of the dimming layer distal from the base substrate 011 may be shown in FIG. 7. The protective layer 013 may protect the dimming unit 012A. Optionally, the protective layer 013 may be made of a light-transmitting material with a high refractive index, and for example, may be a light-transmitting organic material. Illustratively, an organic material layer may be formed on a side of the dimming layer 012 distal from the base substrate 011 by any one of processes such as deposition, coating and sputtering, and is processed through the one-step patterning process to obtain the protective layer 013. Or, the protective film may be attached on the side of the dimming layer 012 distal from the base substrate 011, and serves as the protective layer 013.

Those skilled in the art may easily understand that the embodiment of the present disclosure takes an example for manufacturing the dimming mirror 01 shown in FIG. 7 for illustration. When the reflective dimming mirror 01 shown in FIG. 8 is manufactured, prior to step 706, the method may further include: forming a reflective layer 014 on a side of the dimming layer 012 distal from the base substrate 011. Accordingly, step 706 may include: forming a protective layer 013 on a side of the reflective layer 014 distal from the base substrate 011. Optionally, a reflective film may be attached on the side of the dimming layer 012 distal from the base substrate 011 to form the reflective layer 014; or a reflective material may be applied to the side of the dimming layer 012 distal from the base substrate 011 to form the reflective layer 014.

In summary, according to the dimming mirror manufacturing method according to the embodiment of the present disclosure, the dimming mirror includes the dimming layer including the plurality of dimming units. Each of the dimming units includes the first driving structure, the second driving structure and the elastic supporting structure. The first and second driving structures and the elastic supporting structure enclose the dimming chamber. The dimming angle of the dimming unit may be adjusted by using the first and second driving structures to adjust the gap width of the dimming chamber, such that a response wavelength of the dimming mirror is adjusted, thereby facilitating the improvement of the flexibility of the dimming mirror.

Figure 20:
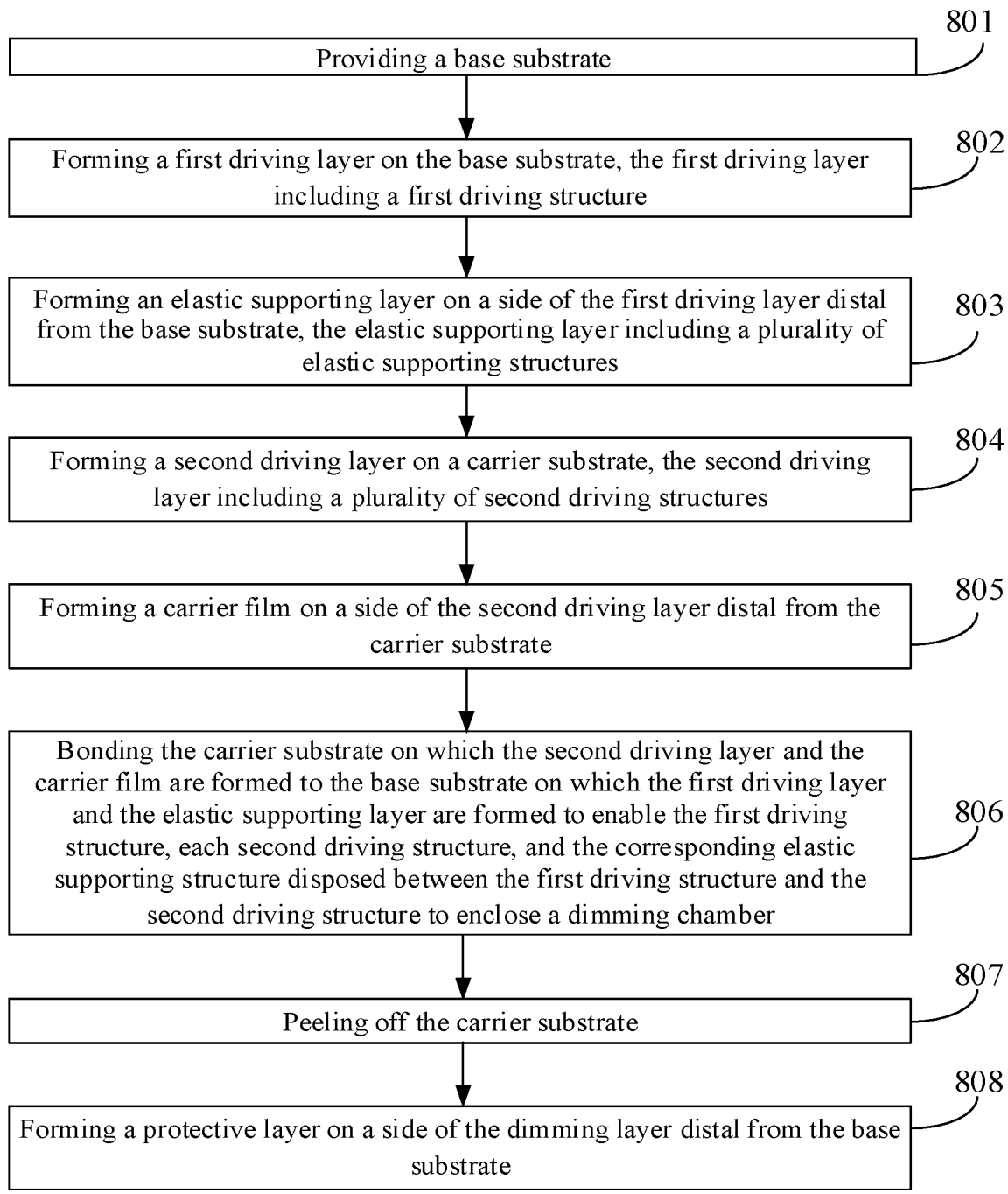
FIG. 20 is a flowchart of still another a dimming mirror manufacturing method according to an embodiment of the present disclosure.

FIG. 20 shows a flowchart of still another dimming mirror manufacturing method according to an embodiment of the present disclosure. The method may be configured to manufacture any one of the dimming mirrors 01 shown in FIG. 3, FIG. 4, and FIG. 6 to FIG. 11. The embodiment takes the dimming mirror 01 manufactured in FIG. 7 as an example for illustration. Referring to FIG. 20, the method may include the following steps.

In step 801, a base substrate is provided.

In step 802, a first driving layer is formed on the base substrate, and includes a first driving structure.

In step 803, an elastic supporting layer is formed on a side of the first driving layer distal from the base substrate, and includes a plurality of elastic supporting structures.

For implementation of steps 801 to 803, reference may be made to steps 701 to 703 in the embodiment shown in FIG. 15, and FIGS. 16 and 17, which is not repeated in the embodiment of the present disclosure herein.

In step 804, a second driving layer is formed on a carrier substrate, and includes a plurality of second driving structures.

Figure 21:
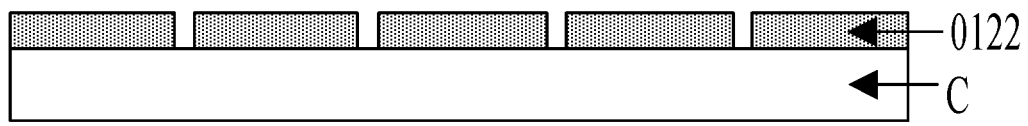
FIG. 21 is a schematic diagram after a second driving layer is formed on a carrier substrate according to an embodiment of the present disclosure.

FIG. 21 shows a schematic diagram after a second driving layer is formed on a carrier substrate C according to an embodiment of the present disclosure. Referring to FIG. 21, the second driving layer includes a plurality of second driving structures 0122. Optionally, the second driving structure 0122 may be made of one or a combination of ITO, IZO, and ZnO:Al. Illustratively, an ITO material layer may be formed on the carrier substrate C by any one of processes such as deposition, coating and sputtering, and is processed through the one-step patterning process to obtain the second driving layer. The carrier substrate C may be a transparent base plate, and for example, may be a rigid base plate made of non-metallic light-guiding material having a certain rigidity, such as glass, quartz or transparent resin.

In step 805, a carrier film is formed on a side of the second driving layer distal from the carrier substrate.

Figure 22:
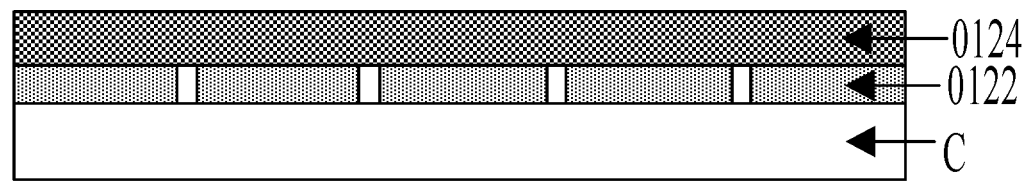
FIG. 22 is a schematic diagram after a carrier film is formed on a side of the second driving layer distal from the carrier substrate according to an embodiment of the present disclosure.

FIG. 22 a schematic diagram after a carrier film 0124 is formed on a side of the second driving layer distal from the carrier substrate C according to an embodiment of the present disclosure. For implementation of step 805, reference may be made to step 704 in the embodiment shown in FIG. 15, which is not repeated in the embodiment of the present disclosure herein.

In step 806, the carrier substrate on which the second driving layer is formed is bonded to the base substrate on which the first driving layer and the elastic supporting layer are formed to enable the first driving structure, each second driving structure, and the corresponding elastic supporting structure disposed between the first driving structure and the second driving structure to enclose the dimming chamber.

Figure 23:
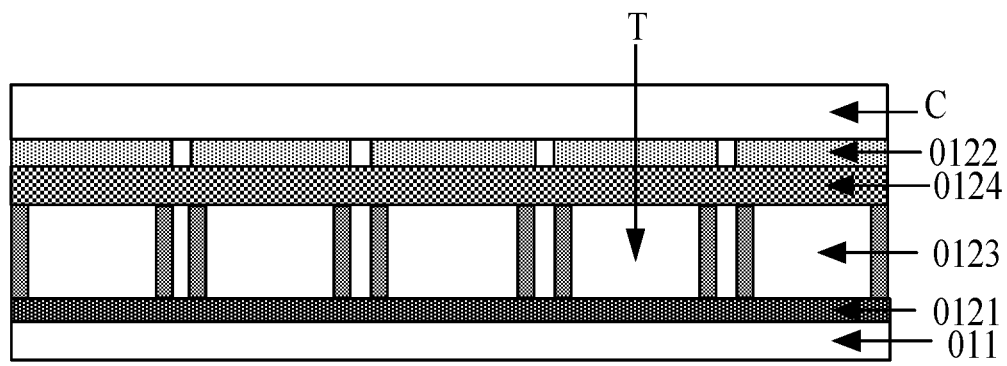
FIG. 23 is a schematic diagram after the carrier substrate is bonded to the base substrate according to an embodiment of the present disclosure.

FIG. 23 shows a schematic diagram after the carrier substrate C on which the second driving layer and the carrier film 0124 are formed is bonded to the base substrate 011 on which the first driving layer and the elastic supporting layer are formed. Referring to FIG. 23, the first driving structure 0121, each second driving structure 0122, and the corresponding elastic supporting structure 0123 disposed between the first driving structure 0121 and the second driving structure 0122 enclose the dimming chamber T. Optionally, the carrier substrate C and the base substrate 011 may be aligned to enable the second driving structures 0122 and the elastic supporting structures 0123 to correspond to each other one by one; and then, the carrier substrate C on which the second driving layer and the carrier film 0124 are formed is bonded, by a bonding process, to the base substrate 011 on which the first driving layer and the elastic supporting layer are formed. Illustratively, the carrier film 0124 may be bonded to the second driving structure 0122 by an adhesive.

In step 807, the carrier substrate is peeled off.

Figure 24:
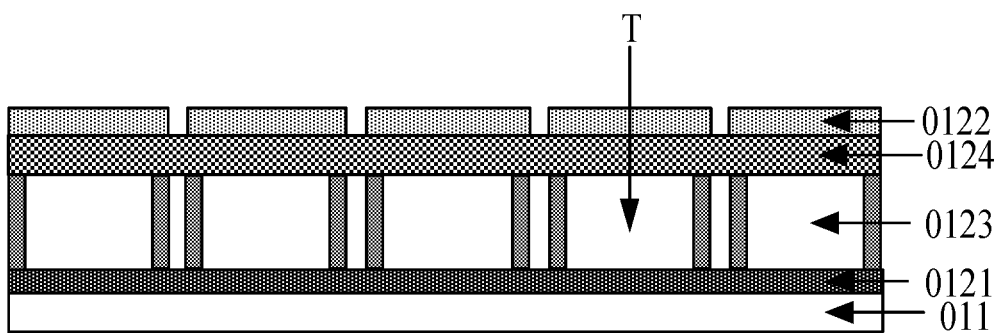
FIG. 24 is a schematic diagram after the carrier substrate is peeled off according to an embodiment of the present disclosure.

FIG. 24 shows a schematic diagram after the carrier substrate C is peeled off according to an embodiment of the present disclosure. Optionally, the carrier substrate C may be peeled off by using a laser peeling process.

In step 808, a protective layer is formed on a side of the dimming layer distal from the base substrate.

For implementation of step 808, reference may be made to step 706 in the embodiment shown in FIG. 15, which is not repeated in the embodiment of the present disclosure herein.

Those skilled in the art may easily understand that the embodiment of the present disclosure takes an example for manufacturing the dimming mirror 01 shown in FIG. 7 for illustration. When the reflective dimming mirror 01 shown in FIG. 8 is manufactured, prior to step 808, the method may further include: forming a reflective layer 014 on a side of the dimming layer 012 distal from the base substrate 011. Accordingly, step 808 may include: forming a protective layer 013 on a side of the reflective layer 014 distal from the base substrate 011. Or, prior to forming the second driving layer on the carrier substrate C, a reflective layer 014 may be formed on the carrier substrate C, which is limited in the embodiment of the present disclosure.

In summary, according to the dimming mirror manufacturing method according to the embodiment of the present disclosure, the dimming mirror includes the dimming layer including the plurality of dimming units. Each of the dimming units includes the first driving structure, the second driving structure and the elastic supporting structure. The first and second driving structures and the elastic supporting structure enclose the dimming chamber. The dimming angle of the dimming unit may be adjusted by using the first and second driving structures to adjust the gap width of the dimming chamber, such that a response wavelength of the dimming mirror is adjusted, thereby facilitating the improvement of the flexibility of the dimming mirror.

In the dimming mirror manufacturing method according to the embodiment of the present disclosure, the order of the steps may be appropriately adjusted, and the steps may be correspondingly increased or decreased as needed. Change methods which may be easily expected by any person skilled in the art within the technical scope disclosed by the present disclosure should be covered by the protection scope of the present disclosure, and thus are not repeated herein any further.

In the dimming mirror manufacturing method according to the embodiment of the present disclosure, the one-step patterning process may include photoresist coating, exposure, development, etching, and photoresist peeling off. Processing the material layer (such as the ITO material layer) by the one-step patterning process includes: firstly, coating a layer of photoresist on the material layer (such as the ITO material layer) to form a photoresist layer; secondly, exposing the photoresist layer with a mask to enable the photoresist layer to form a fully-exposed area and a non-exposed area; thirdly, completely removing the photoresist in the fully-exposed area and retaining the photoresist in the non-exposed area through the developing process; fourthly, etching an area corresponding to the fully-exposed area in the material layer (such as the ITO material layer) through the etching process; and fifthly, peeling off the photoresist in the non-exposed area to obtain a corresponding structure (such as a first driving layer). Although a positive photoresist is taken as the photoresist for illustration herein, for implementation of the one-step patterning process, reference may be made to the description in this paragraph when the photoresist is a negative photoresist, which is not described in the embodiment of the present disclosure herein.

On the basis of the same inventive concept, an embodiment of the present disclosure further provides a dimming apparatus. The dimming apparatus includes the dimming mirror according to any of the above embodiments, and may be various types of lenses or an optical device such as a microscope. For example, the dimming apparatus may be any product or component having a dimming function, such as a mobile phone, a camera, a security monitoring device, an augmented reality (AR) device, or a virtual reality (VR) device.

The term "and/or" in embodiments of the present disclosure merely describes the association relationship between the associated objects and indicates that there may be three relationships; for example, A and/or B may indicate three cases where only A exists, A and B exist at the same time, and only B exists. The character "/" in the present disclosure generally indicates that the relationship between the former and later associated objects is "OR".

The term "at least one of A and B" in the present disclosure merely describes the association relationship between the associated objects and indicates that there may be three relationships; for example, at least one of A and B may indicate three cases where only A exists, A and B exist at the same time, or only B exists.

Described above are merely exemplary embodiments of the present disclosure, and are not intended to limit the present disclosure. Within the spirit and principles of the disclosure, any derived modifications, equivalent substitutions, improvements, or the like are within the protection scope of the present disclosure.

What is claimed is:

1. A dimming mirror, comprising:
   a base substrate, and a dimming layer disposed on the base substrate, wherein the dimming layer comprises a plurality of dimming units;
   wherein each of the dimming units comprises a first driving structure and a second driving structure opposite to each other, and an elastic supporting structure disposed between the first driving structure and the second driving structure, the first and second driving structures and the elastic supporting structure enclosing a dimming chamber;

wherein the first and second driving structures are configured to adjust a dimming angle of the dimming unit by adjusting a gap width of the dimming chamber; and wherein the dimming unit further comprises: a carrier film and a reflective layer, the carrier film being disposed on a side of the elastic supporting structure distal from the first driving structure, the second driving structure being disposed on a side of the carrier film distal from the first driving structure, and the reflective layer being disposed on a side of the second driving structure distal from the carrier film.

2. The dimming mirror according to claim 1, wherein the dimming chamber satisfies any one of the following conditions:

the dimming chamber is an empty chamber; and an elastic refractive medium is provided in the dimming chamber.

3. The dimming mirror according to claim 1, wherein the first driving structure is plate-shaped, and the first driving structures of all the dimming units are formed into an integrated structure; and the second driving structure is block-shaped, and a shape of a cross section of the second driving structure comprises at least one of a circle and a polygon.

4. The dimming mirror according to claim 1, wherein the first driving structure and the second driving structure satisfy any one of the following conditions:

both the first driving structure and the second driving structure are a driving electrode;

both the first driving structure and the second driving structure are an electromagnetic driving structure;

at least one of the first driving structure and the second driving structure is a thermal expansion driving structure; and at least one of the first driving structure and the second driving structure is a pneumatic driving structure.

5. The dimming mirror according to claim 1, wherein the carrier films of all the dimming units are formed into an integrated structure.

6. The dimming mirror according to claim 1, wherein the first driving structure, the elastic supporting structure, the carrier film, and the second driving structure are distributed in a direction distal from the base substrate.

7. The dimming mirror according to claim 1, wherein the plurality of dimming units satisfy any one of the following conditions:

the plurality of dimming units are arranged in an array to form a plurality of dimming rings and a dimming circle which are concentric, wherein the plurality of dimming rings are equally spaced apart from each other outside the dimming circle in a direction distal from the dimming circle;

the plurality of dimming units are arranged in an array to form a plurality of linear dimming strips which are parallel to each other and are equally spaced apart from each other; and the plurality of dimming units are arranged in an array to form a plurality of arc-shaped dimming strips which are equally spaced apart from each other on the same fan-shaped area and share a common circle center.

8. The dimming mirror according to claim 1, further comprising:

a protective layer disposed on a side of the dimming layer distal from the base substrate.

9. The dimming mirror according to claim 1, wherein the dimming mirror comprises any one of a biconvex lens, a planta-convex lens, and a plana-concave lens.

10. The dimming mirror according to claim 1, wherein the carrier films of all the dimming units are formed into an integrated structure; the first driving structure is plate-shaped, and the first driving structures of all the dimming units are formed into an integrated structure; the second driving structure is block-shaped, and a shape of a cross section of the second driving structure comprises at least one of a circle and a polygon;

the first driving structure and the second driving structure satisfy any one of the following conditions:

both the first driving structure and the second driving structure are a driving electrode, and both the first driving structure and the second driving structure are an electromagnetic driving structure, at least one of the first driving structure and the second driving structure is a thermal expansion driving structure, and at least one of the first driving structure and the second driving structure is a pneumatic driving structure;

the dimming chamber satisfy any one of the following conditions:

the dimming chamber is an empty chamber, and an elastic refractive medium is provided in the dimming chamber;

the plurality of dimming units satisfy any one of the following conditions:

the plurality of dimming units are arranged in an array to form a plurality of dimming rings and a dimming circle which are concentric, and the plurality of dimming rings are equally spaced apart outside the dimming circle in a direction distal from the dimming circle, the plurality of dimming units are arranged in an array to form a plurality of linear dimming strips which are parallel to each other and are equally spaced apart, and the plurality of dimming units are arranged in an array to form a plurality of arc-shaped dimming strips which are equally spaced apart on the same fan-shaped area and share a common circle center; and the dimming mirror further comprises:

a protective layer disposed on a side of the reflective layer distal from the base substrate.

11. A method for manufacturing a dimming mirror, comprising:

providing a base substrate; and forming a dimming layer on the base substrate, wherein the dimming layer comprises a plurality of dimming units; each of the dimming units comprises a first driving structure and a second driving structure opposite to each other, an elastic supporting structure disposed between the first driving structure and the second driving structure, the first and second driving structures and the elastic supporting structure enclosing a dimming chamber;

wherein the first and second driving structures are configured to adjust a dimming angle of the dimming unit by adjusting a gap width of the dimming chamber, wherein forming the dimming layer on the base substrate comprises:

forming a first driving layer on the base substrate the first driving layer comprising a first driving structure;

forming an elastic supporting layer on a side of the first driving layer distal from the base substrate, the elastic supporting layer comprising a plurality of elastic supporting structures;

forming a second driving layer on a carrier substrate, the second driving layer comprising a plurality of second driving structures;

bonding the carrier substrate on which the second driving layer is formed to the base substrate on which the first driving layer and the elastic supporting layer are formed to enable the first driving structure, each second driving structure, and the corresponding elastic supporting structure disposed between the first driving structure and the second driving structure to enclose the dimming chamber; and peeling off the carrier substrate.

12. The method according to claim 11, wherein forming the dimming layer on the base substrate comprises:

forming a first driving layer on the base substrate, the first driving layer comprising a first driving structure;

forming an elastic supporting layer on a side of the first driving layer distal from the base substrate, the elastic supporting layer comprising a plurality of elastic supporting structures; and forming a second driving layer on a side of the elastic supporting layer distal from the base substrate, the second driving layer comprising a plurality of second driving structures;

wherein the first driving structure, each second driving structure, and the corresponding elastic supporting structure disposed between the first driving structure and the second driving structure enclose the dimming chamber.

13. The method according to claim 12, wherein upon forming the elastic supporting layer on the side of the first driving layer distal from the base substrate, the method further comprises:

forming a carrier film on a side of the elastic supporting layer distal from the base substrate; and forming the second driving layer on the side of the elastic supporting layer distal from the base substrate comprises:

forming the second driving layer on a side of the carrier film distal from the base substrate.

14. The method according to claim 11, wherein upon forming the second driving layer on the carrier substrate, the method further comprises:

forming a carrier film on a side of the second driving layer distal from the carrier substrate; and bonding the carrier substrate on which the second driving layer is formed to the base substrate on which the first driving layer and the elastic supporting layer are formed comprises:

bonding the carrier substrate on which the second driving layer and the carrier film are formed to the base substrate on which the first driving layer and the elastic supporting layer are formed.

15. The method according to claim 11, wherein upon forming the dimming layer on the base substrate, the method further comprises:

forming a protective layer on a side of the dimming layer distal from the base substrate.

16. The method according to claim 15, wherein prior to forming the protective layer on the side of the dimming layer distal from the base substrate, the method further comprises:

forming a reflective layer on a side of the dimming layer distal from the base substrate; and forming the protective layer on the side of the dimming layer distal from the base substrate comprises:

forming the protective layer on a side of the reflective layer distal from the base substrate.

17. A dimming apparatus, comprising a dimming mirror, wherein the dimming mirror comprises a base substrate, and a dimming layer disposed on the base substrate: the dimming layer comprising a plurality of dimming units;

wherein each of the dimming units comprises a first driving structure and a second driving structure opposite to each other, and an elastic supporting structure disposed between the first driving structure and the second driving structure, the first and second driving structures and the elastic supporting structure enclosing a dimming chamber;

wherein the first and second driving structures are configured to adjust a dimming angle of the dimming unit by adjusting a gap width of the dimming chamber, wherein the dimming layer is formed by:

forming a first driving layer on the base substrate, the first driving layer comprising the first driving structure;

forming an elastic supporting layer on a side of the first driving layer distal from the base substrate, the elastic supporting layer comprising a plurality of elastic supporting structures;

forming a second driving layer on a carrier substrate, the second driving layer comprising a plurality of second driving structures;

bonding the carrier substrate on which the second driving layer is formed to the base substrate on which the first driving layer and the elastic supporting layer are formed to enable the first driving structure, each second driving structure, and the corresponding elastic supporting structure disposed between the first driving structure and the second driving structure to enclose the dimming chamber; and peeling off the carrier substrate.

* * * * *